(12) United States Patent
Yamada et al.

(10) Patent No.: US 8,081,545 B2
(45) Date of Patent: Dec. 20, 2011

(54) OPTICAL DISK IMAGE FORMING DEVICE AND OPTICAL DISK IMAGE FORMING METHOD

(75) Inventors: Seiya Yamada, Hamamatsu (JP); Hisanori Itoga, Hamamatsu (JP); Tatsuo Fushiki, Hamamatsu (JP); Hiroshi Kubo, Odawara (JP); Michihiro Shibata, Odawara (JP)

(73) Assignees: Yamaha Corporation, Hamamatsu-shi (JP); Fujifilm Corporation, Tokyo (JP)

(*) Notice: Subject to any disclaimer, the term of this patent is extended or adjusted under 35 U.S.C. 154(b) by 637 days.

(21) Appl. No.: 11/909,898

(22) PCT Filed: Sep. 29, 2006

(86) PCT No.: PCT/JP2006/319583
§ 371 (c)(1),
(2), (4) Date: Sep. 27, 2007

(87) PCT Pub. No.: WO2007/037435
PCT Pub. Date: Apr. 5, 2007

(65) Prior Publication Data
US 2009/0290459 A1    Nov. 26, 2009

(30) Foreign Application Priority Data

Sep. 30, 2005 (JP) ................................. 2005-288743

(51) Int. Cl.
*G11B 5/09* (2006.01)
(52) U.S. Cl. ...................................... 369/47.5; 369/116
(58) Field of Classification Search .................. 369/47.5
See application file for complete search history.

(56) References Cited

U.S. PATENT DOCUMENTS

| | | | | |
|---|---|---|---|---|
| 7,015,939 B2 * | 3/2006 | Honda et al. | ................. | 347/225 |
| 7,082,094 B2 * | 7/2006 | Morishima et al. | ........... | 369/116 |
| 7,268,794 B2 * | 9/2007 | Honda et al. | ................. | 347/224 |
| 7,505,383 B2 * | 3/2009 | Morishima | .................. | 369/47.4 |
| 7,558,169 B2 * | 7/2009 | Morishima | ................ | 369/44.35 |
| 7,715,289 B2 * | 5/2010 | Van Endert et al. | ......... | 369/47.5 |
| 2002/0191517 A1 | 12/2002 | Honda et al. | | |
| 2004/0057356 A1 | 3/2004 | Morishima | | |

FOREIGN PATENT DOCUMENTS

EP    1 308 938 A2    5/2003
(Continued)

OTHER PUBLICATIONS

Supplementary European Search Report dated Nov. 11, 2008 (eight (8) pages).

(Continued)

*Primary Examiner* — Aristotelis Psitos
(74) *Attorney, Agent, or Firm* — Crowell & Moring LLP

(57) ABSTRACT

When an optical disk image forming device forms an image on an optical disk, the image forming device reads information of kinds of coloring matters used in an image forming area from information described in an information area of the optical disk. Then, the optical disk image forming device reads from a table laser power strength information corresponding to the information of the kinds of the coloring matters and a maximum linear velocity (Nx) at the time of forming the image and applies a laser beam having this laser power strength to form the image on the image forming area of the optical disk. Thus, since the discoloration of the coloring matter in the image forming area is always saturated, the image having a constant contrast can be formed on the image forming area of the optical disk.

12 Claims, 6 Drawing Sheets

FOREIGN PATENT DOCUMENTS

| | | |
|---|---|---|
| JP | 2002-203321 A | 7/2002 |
| JP | 2004-30800 A | 1/2004 |
| JP | 2004-355764 A | 12/2004 |
| JP | 2005-50409 A | 2/2005 |
| JP | 2005-196917 A | 7/2005 |

OTHER PUBLICATIONS

International Search Report dated Oct. 31, 2006 with English translation (Three (3) Pages).

Japanese Office Action dated Jun. 17, 2010 (One (1) page).

* cited by examiner

FIG. 4

| INFORMATION OF INFORMATION AREA | RECORDING SPEED | PARAMETER |
|---|---|---|
| NAME OF COLORING MATTER | NUMBER OF MULTIPLICATION OF SPEED | LASER POWER |
| Oxonol | 1 | 23mW |
| Oxonol | 2 | 28mW |
| Oxonol | 4 | 33mW |
| Oxonol | 8 | 38mW |
| Oxonol | 16 | 43mW |
| ⋮ | ⋮ | ⋮ |
| Azo | 1 | 25mW |
| Azo | 2 | 30mW |
| Azo | 4 | 35mW |
| Azo | 8 | 40mW |
| Azo | 16 | 45mW |
| ⋮ | ⋮ | ⋮ |
| Cyanine | 1 | 20mW |
| Cyanine | 2 | 25mW |
| Cyanine | 4 | 30mW |
| Cyanine | 8 | 35mW |
| Cyanine | 16 | 40mW |
| ⋮ | ⋮ | ⋮ |

OPTICAL DISK IMAGE FORMING DEVICE AND OPTICAL DISK IMAGE FORMING METHOD

TECHNICAL FIELD

The present invention relates to an optical disk image forming device and an optical disk image forming method for forming a visible image having a uniform contrast on the entire image forming surface of an optical disk.

BACKGROUND ART

The invention concerning an image forming device or an optical disk for forming a visible image such as a character or a picture on a data recording surface of a recording type optical disk capable of recording data such as a CD-R or a DVD-R or on an exclusive label surface provided in an opposite side to the data recording surface to which a special processing is applied has been hitherto disclosed (for instance, see Patent Documents 1 and 2). This technique employs a phenomenon that colors are different (visible ray characteristics change) between a part on which the data is recorded by applying a laser beam to the data recording layer (a coloring matter layer or a dye layer) of the optical disk and a part on which the data is not recorded. This technique is employed so that a visible image can be formed on the data recording surface of the optical disk or the label surface of the optical disk on which the coloring matter layer is formed.
Patent Document 1: JP-A-2004-355764
Patent Document 2: JP-A-2002-203321

DISCLOSURE OF THE INVENTION

Problems that the Invention is to Solve

In a process for recording information by irradiating the optical disk with the laser beam, when the optical disk is rotated by a CAV system (at constant angular velocity), a linear velocity is different depending on the position of the optical disk in the radial direction, that is, the linear velocity is different between the inner peripheral part and the outer peripheral part of the optical disk. Therefore, when the laser beam is applied to the optical disk with a constant laser power, as the linear velocity is more increased, the strength of the laser beam applied to each unit area is the more weakened. Thus, a method has been hitherto proposed, as disclosed in the Patent Document 1, in which in order to make the strength of the laser beam applied to each unit area constant, as the recording position in the radial direction of the optical disk moves from the inner peripheral part to the outer peripheral part, the laser power is gradually increased.

However, in the above-described optical disk device, when the visible image to be formed on the optical disk is formed on the label surface side on which a track for recording the data is not formed, if the laser beam is applied to the optical disk, the laser power cannot be controlled at any time by recognizing the change of a reflection power on the recording surface due to the adhesion of dust, an unevenness in application of a coloring matter, a surface vibration or the like as in a running OPC that is carried out when the data is recorded on the data recording surface on which the track is formed. Accordingly, the strength of the laser beam applied to each unit area is not fixed and different depending on positions owing to the state of dust adhering to the label surface of the optical disk or a disturbance such as the surface vibration during forming the visible image. Thus, a problem arises that the difference of the contrast is generated in the visible image.

Thus, it is an object of the present invention to solve the above-described problems and to provide an optical disk image forming device and an optical image forming method that can form a visible image having a uniform contrast over an entire part of a label surface of an optical disk on which a track is not formed.

Means for Solving the Problems

The present invention has below-described structures as means for solving the above-described problems.

(1) An optical disk image forming device for forming a visible image on an optical disk has a coloring matter layer and an image forming area set. The optical disk image forming device comprises: rotating means for rotating the optical disk at a constant angular velocity; laser applying means for applying a laser beam to the optical disk to form the visible image on the image forming area; and laser power setting means for setting the laser power strength of the laser beam applied by the laser applying means when the visible image is formed in the image forming area to a constant laser power strength by which the discoloration of a coloring matter is saturated over the entire part of the image forming area.

In this structure, when the optical disk device rotates the optical disk having the layer on which the coloring matter is applied at the constant angular velocity and applies the laser beam to the optical disk to form the image, the optical disk device applies the laser beam having the laser power strength by which the discoloration of the coloring matter is saturated over the entire part of the image forming area to form the visible image. Accordingly, when the optical disk is rotated at the constant angular velocity, a linear velocity is increased the more in an outer periphery side in the radial direction the optical disk. However, since the laser beam having the constant laser power strength by which the discoloration of the coloring matter is saturated is applied over the entire part of the image forming area, the visible image can be formed in which the discoloration of the coloring matter is always saturated, that is, the contrast is constant without receiving the influence of a disturbance such as dust or a surface vibration. Further, usually, when an optical disk is rotated at a constant angular velocity, since a linear velocity is increased the more in an outer periphery side in the radial direction of the optical disk, as a recording position in the radial direction of the optical disk moves from an inner peripheral part to an outer peripheral part, a laser power is controlled to be gradually increased so as to equalize the strength of a laser beam applied to each unit area. However, in the present invention, since the laser power is not changed depending on the position in the radial direction of the optical disk and the laser beam of the constant laser power strength is applied to form the visible image in the image forming area of the optical disk, the control of the laser power can be simplified.

(2) An optical disk image forming device according to (1), wherein the laser applying means reads the information of the coloring matter used in the image forming area from an information area set in the optical disk, and the laser power setting means sets the constant laser power strength by which the discoloration of the coloring matter is saturated in accordance with the information of the coloring matter.

In this structure, when the optical disk image forming device applies the laser beam to the optical disk rotating at the constant angular velocity to form the visible image, the device reads the information of the coloring matter used in the image forming area from the information area set in the optical disk and applies the laser beam of the laser power strength by which the discoloration of the coloring matter is saturated over the entire part of the image forming area to form the visible image, Accordingly, the laser beam of an optimum laser power strength by which the discoloration of the coloring matter is saturated is applied depending on the coloring matter used in the optical disk, so that the visible image having a constant contrast can be formed over the entire part of the image forming area of the optical disk.

(3) An optical disk image forming device according to (1) or (2), wherein the laser power setting means sets, as the constant laser power strength by which the discoloration of the coloring matter is saturated, a laser power strength by which an asymmetry or a degree of modulation is saturated when a linear velocity is maximum at the time of forming the image.

When the laser beam of the laser power strength by which the asymmetry or the degree of modulation is saturated is applied to the coloring matter, the discoloration of the coloring matter used in the image forming area of the optical disk is saturated. Further, the asymmetry or the degree of modulation is saturated even by the laser beam having a weak laser power strength when the linear velocity is low. However, when the linear velocity is increased, the asymmetry or the degree of modulation is unsaturated under the laser power strength kept as it is. To saturate the asymmetry or the degree of modulation, the laser power strength needs to be increased. In this structure, the laser power strength is set to such a laser power strength as to saturate the discoloration of the coloring matter by applying the laser beam when the linear velocity is maximum during forming the image, that is, in the outermost peripheral side in the radial direction of the optical disk in the image forming area. Accordingly, even when the laser power strength applied to the image forming area is varied due to the disturbance of the surface vibration, since the laser beam of the laser power strength by which the discoloration of the coloring matter is saturated can be subsequently applied, the visible image having the constant contrast can be formed in the image forming area without receiving the influence thereof.

(4) An optical disk image forming device according to (3), further comprising storing means for storing the laser power strength by which the asymmetry or the degree of modulation is saturated for each of a plurality of coloring matters used in the image forming area and at each maximum linear velocity that can be set at the time of forming the visible image, wherein the laser power setting means reads from the storing means the laser power strength by which the asymmetry or the degree of modulation corresponding to the information of the maximum linear velocity set at the time of forming the visible image and the information of the coloring matter is saturated to set the read laser power strength as the constant laser power strength by which the discoloration of the coloring matter is saturated.

In this structure, the optical disk image forming device reads from the storing means the laser power strength corresponding to the information of the coloring matter used in the image forming area that is recorded in the information area of the optical disk and the information of the maximum liner velocity at the time of forming the image and sets the laser power strength as the constant laser power strength of the laser beam applied to the image forming area during forming the image by which the discoloration of the coloring matter is saturated. Accordingly, the laser beam of a proper laser power strength is applied so that the visible image can be formed in the image forming area of the optical disk.

(5) A method for forming a visible image on an optical disk has a layer on which a coloring matter is applied and an image forming area set. The method comprises: a rotating step for rotating the optical disk at a constant angular velocity; a laser power strength setting step for setting the laser power strength of a laser beam applied to the image forming area to form the visible image on the image forming area to a constant laser power strength by which the discoloration of the coloring matter is saturated over the entire part of the image forming area; and an image forming step for forming the visible image on the image forming area by irradiating the optical disk with the laser beam having the constant power strength.

(6) A method according to (5), wherein the laser power strength setting step includes a step for reading the information of the coloring matter used in the image forming area from an information area set in the optical disk, and setting the constant laser power strength by which the discoloration of the coloring matter is saturated in accordance with the information of the coloring matter.

(7) A method according to (5) or (6), wherein in the laser power strength setting step, as the constant laser power strength by which the discoloration of the coloring matter is saturated, a laser power strength is set by which an asymmetry or a degree of modulation is saturated when a linear velocity is maximum at the time of forming the visible image.

(8) A method according to (7), further comprising a storing step for storing in storing means the laser power strength by which the asymmetry or the degree of modulation is saturated for each of a plurality of coloring matters used in the image forming area and at each maximum linear velocity that can be set at the time of forming the visible image, wherein in the laser power strength setting step, the laser power strength is read by which the asymmetry or the degree of modulation corresponding to the information of the maximum linear velocity set at the time of forming the visible image and the information of the coloring matter from the storing means to set the read laser power strength as the constant laser power strength by which the discoloration of the coloring matter is saturated.

(9) In an image forming system for forming a visible image by applying a laser beam to an image forming area set in an optical disk, the image forming system comprises: an optical disk having a coloring matter layer discolored by applying the laser beam thereto; rotating means for rotating the optical disk at a constant angular velocity; laser applying means for applying the laser beam to the optical disk to form the visible image on the image forming area; and laser power setting means for setting the laser power strength of the laser beam applied by the laser applying means when the visible image is formed in the image forming area to a constant laser power strength by which the discoloration of a coloring matter is saturated over the entire part of the image forming area.

(10) An optical disk image forming system according to (9), wherein the laser applying means reads the information of the coloring matter used in the image forming area from an information area set in the optical disk, and the laser power setting means sets the constant laser power strength by which the discoloration of the coloring matter is saturated in accordance with the information of the coloring matter.

(11) An optical disk image forming system according to (9) or (10), wherein the laser power setting means sets, as the constant laser power strength by which the discoloration of the coloring matter is saturated, a laser power strength by which an asymmetry or a degree of modulation is saturated when a linear velocity is maximum at the time of forming the image.

(12) An optical disk forming system according to (11), further comprising storing means for storing the laser power strength by which the asymmetry or the degree of modulation is saturated for each of a plurality of coloring matters used in the image forming area and at each maximum linear velocity that can be set at the time of forming the visible image, wherein the laser power setting means reads from the storing means the laser power strength by which the asymmetry or the degree of modulation corresponding to the information of the maximum linear velocity set at the time of forming the visible image and the information of the coloring matter is saturated to set the read laser power strength as the constant laser power strength by which the discoloration of the coloring matter is saturated.

In the optical disk image forming device and the optical disk image forming method of the present invention, the laser beam of the constant laser power by which the discoloration of the coloring matter is saturated is applied to the coloring matter used in the discoloring layer (the coloring matter layer) provided in the image forming area of the optical disk to form the visible image. Thus, even if the disturbance such as the surface vibration arises when the visible image is formed on the optical disk, the contrast of the visible image formed on the optical disk can be maintained to a constant level over an entire surface. Further, since the visible image can be formed on the image forming area of the optical disk without changing the laser power depending on the position in the radial direction as in a usual case. Thus, the control of the laser power can be simplified.

BRIEF DESCRIPTION OF THE DRAWINGS

FIG. 4 shows one example of a table for storing the laser power strength data of the laser beam applied to an image forming area when the visible image is formed.

BEST MODE FOR CARRYING OUT THE INVENTION

An optical disk image forming device according to an embodiment of the present invention includes a visible image forming function for forming a visible image on an optical disk with a constant contrast in addition to a function for recording information in the optical disk and a function for reading recorded information on the optical disk that are provided in an ordinary optical disk recording and reproducing device.

Firstly, the structure of the optical disk image forming device will be described. Since the function for recording the information on the data recording surface of the optical disk and the function for reading the information recorded on the data recording surface of the optical disk are a well-known technique, the detailed explanation thereof will be omitted. Further, in the following description, a case that a visible image is formed on an optical disk having a discoloring layer provided in the label surface side of a DVD-R is described as one example. However, the present invention is not limited thereto, and the visible image can be formed on other kinds of recording type optical disks.

<Structure of Optical Disk Image Forming Device>

Figure 1:
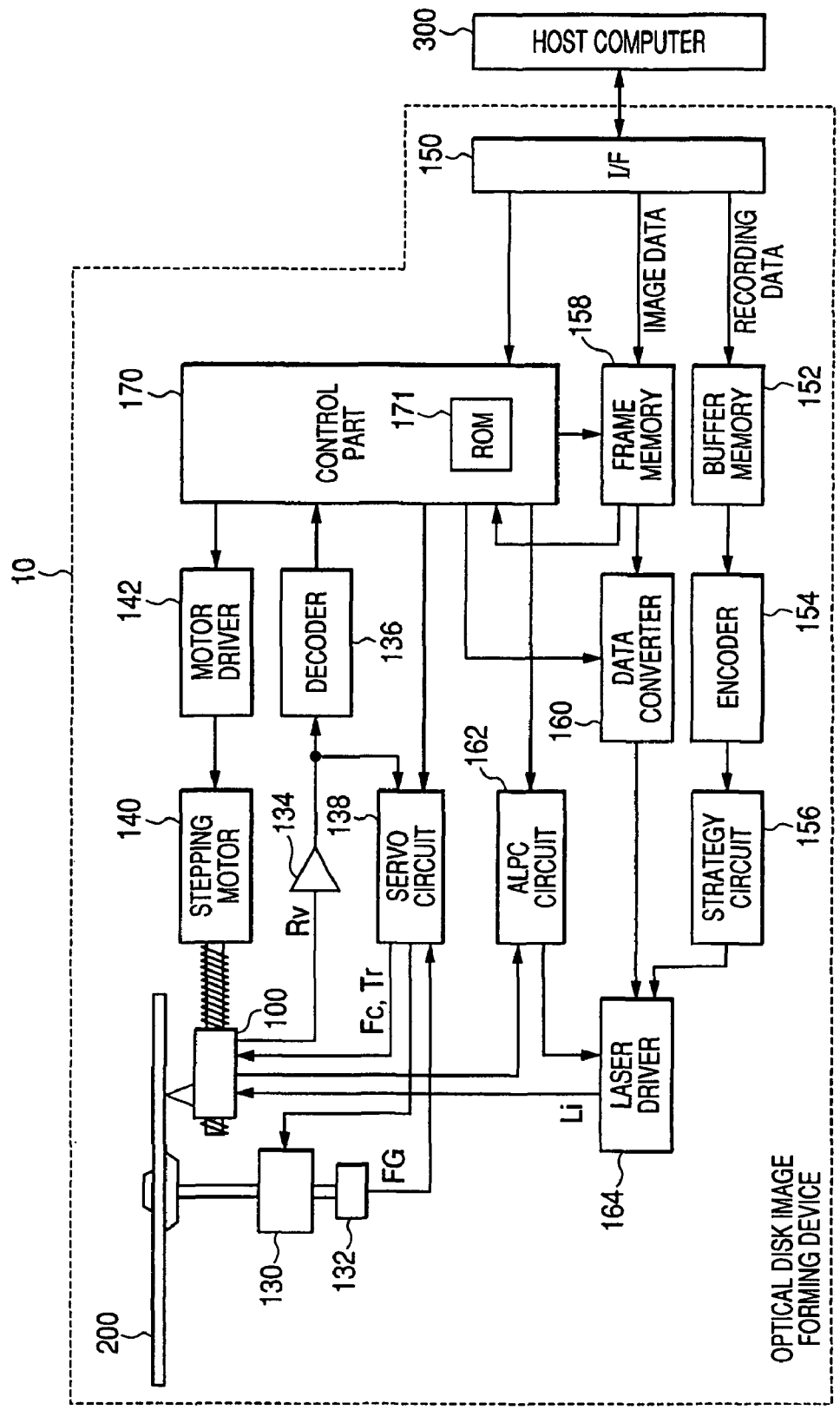
FIG. 1 is a block diagram showing a schematic structure of an optical disk image forming device according to an embodiment of the present invention.

FIG. 1 is a block diagram showing the schematic structure of the optical disk image forming device according to an embodiment of the present invention. As shown in FIG. 1, the optical disk image forming device 10 includes an optical pick-up 100, a spindle motor 130, a rotation detector 132, an RF (Radio Frequency) amplifier 134, a decoder 136, a servo circuit 138, a stepping motor 140, a motor driver 142, an interface 150, a buffer memory 152, an encoder 154, a strategy circuit 156, a frame memory 158, a data converter 160, an automatic laser power control (Automatic Laser Power Control: ALPC) circuit 162, a laser driver 164 and a control part 170. The optical disk image forming device 10 is connected to a host computer 300 through the interface 150. Further, the optical disk image forming device 10 forms the visible image on an optical disk 200 by a CAV (Constant Angular Velocity) system. Further, the optical disk image forming device 10 can record (except a type exclusive for a reproduction) and reproduce data or form the visible image on various kinds of optical disks such as a type exclusive for reproduction, a WORM type and a rewrite type of a DVD system and a CD system.

The spindle motor 130 rotates the optical disk 200 held by a holding mechanism not shown in the drawing.

The rotation detector 132 outputs a signal FG of a frequency corresponding to the rotating speed of the spindle motor 130.

The optical pick-up 100 includes a laser diode, a plurality of lenses such as an objective lens, a tracking servo mechanism or the like and applies a laser beam converged by the lenses to the rotating optical disk 200.

The stepping motor 140 moves the optical pick-up 100 in the radial direction of the optical disk 300 by its rotation.

The motor driver 142 outputs a driving signal for moving the optical pick-up 100 by an amount of movement and in the direction instructed from the control part 170 to the stepping motor 140 to perform a thread control.

The RF amplifier 134 amplifies a light receiving signal Rv output from the optical pick-up 100 to output the amplified signal to the decoder 136 and the servo 138.

When the recording surface of the optical disk 200 is reproduced to read information recorded on the optical disk 200, since the light receiving signal Rv output from the optical pick-up 100 is modulated to 8/16, the decoder 136 demodulates the light receiving signal and outputs the demodulated signal to the control part 170.

The servo circuit 138 carries out a feedback control (a rotation control) so that the rotating speed of the spindle motor 130 detected by the signal FG reaches an angular velocity instructed from the control part 170. Further, the servo circuit 138 performs a tracking control (a tracking servo) and a focus control (a focus servo) relative to the optical pick-up 100.

In the control part 170, only a ROM 171 is illustrated as a detailed structure. However, the control part includes a CPU and a RAM as other members. The CPU not shown in the drawing operates respective parts in accordance with a program stored in the ROM 171 to record the information on the recording surface of the optical disk 200 or form the visible image on the label surface or the recording surface of the optical disk 200. As described below, when the visible image is formed on the optical disk 200, the CPU outputs a signal to the servo circuit 138 or the ALPC circuit 162 on the basis of correction parameters stored in the ROM 171 to correct a laser power or a focus gain.

The interface (I/F) 150 is an interface for receiving a control signal or information supplied from the host computer 300 by the optical disk image forming device 10.

When the information to be recorded on the optical disk 200 (refer it to as recording data, hereinafter.) is supplied from the host computer 300 through the interface 150, the buffer memory 152 records the recording data in an FIFO (first-in first-out) form.

The encoder 154 8/16 modulates the recording data read from the buffer memory 152 and outputs the recording data to the strategy circuit 156.

The strategy circuit 156 applies a timing axis correcting process to the 8/16 modulated signal supplied from the encoder 154 and outputs the signal to the laser driver 164.

When the information (refer it to as visible image data, hereinafter) of the visible image to be formed on the optical disk 200 is supplied from the host computer 300 through the interface 150, the frame memory 158 accumulates the visible image data. This visible image data indicates a set of gradation data prescribing the density of each pixel of the visible image formed in the disk shaped optical disk 200.

When the visible image is formed on the optical disk 200, the data converter 160 converts the strength of the laser beam to a signal for instructing a light level as a strength by which a discoloring layer 204 is adequately discolored when the laser beam is applied thereto or a servo level as a strength by which the discoloring layer 204 is not discolored even when the laser beam is applied thereto, in accordance with the gradation data read from the frame 158 and the number of rotations instructed by the control part 170 and outputs the signal to the laser driver 164.

The ALPC circuit 162 serves to control the strength of the laser beam applied from the laser diode of the optical pick-up 100. Specifically, the ALPC circuit 162 controls the current value of a driving signal Li so that the value of a quantity of the output light of the laser diode detected by a front monitor diode of the optical pick-up 100 corresponds to a target value of an optimum laser power supplied by the control part 170.

Here, in this embodiment, since the CAV system with the constant angular velocity is employed as described above, a linear velocity is increased the more in an outer side of the optical disk 200. Thus, when the data is recorded, as the optical pick-up 100 is located nearer to the outer side of the optical disk 200, the control part 170 sets the target value of the optimum laser power to a higher value. On the other hand, when the visible image is formed, the control part 170 sets, as described below, the target value of the optimum laser power to a target value of the laser power at which the discoloration of a coloring matter in the discoloring layer 204 of the optical disk 200 is saturated.

When the information is recorded, the laser driver 164 generates the driving signal Li that represents control contents by the ALPC circuit 162 in accordance with the modulated data supplied from the strategy circuit 156 and supplies the driving signal to the laser diode of the optical pick-up 100. Further, when the visible image is formed, the laser driver generates the driving signal Li that represents control contents by the ALPC circuit 162 in accordance with the data converted by the data modulator 160 and supplies the driving signal to the laser diode of the optical pick-up 100. Thus, the strength of the laser beam by the laser diode is feedback controlled so as to correspond to the target value supplied from the control part 170.

Figure 2:
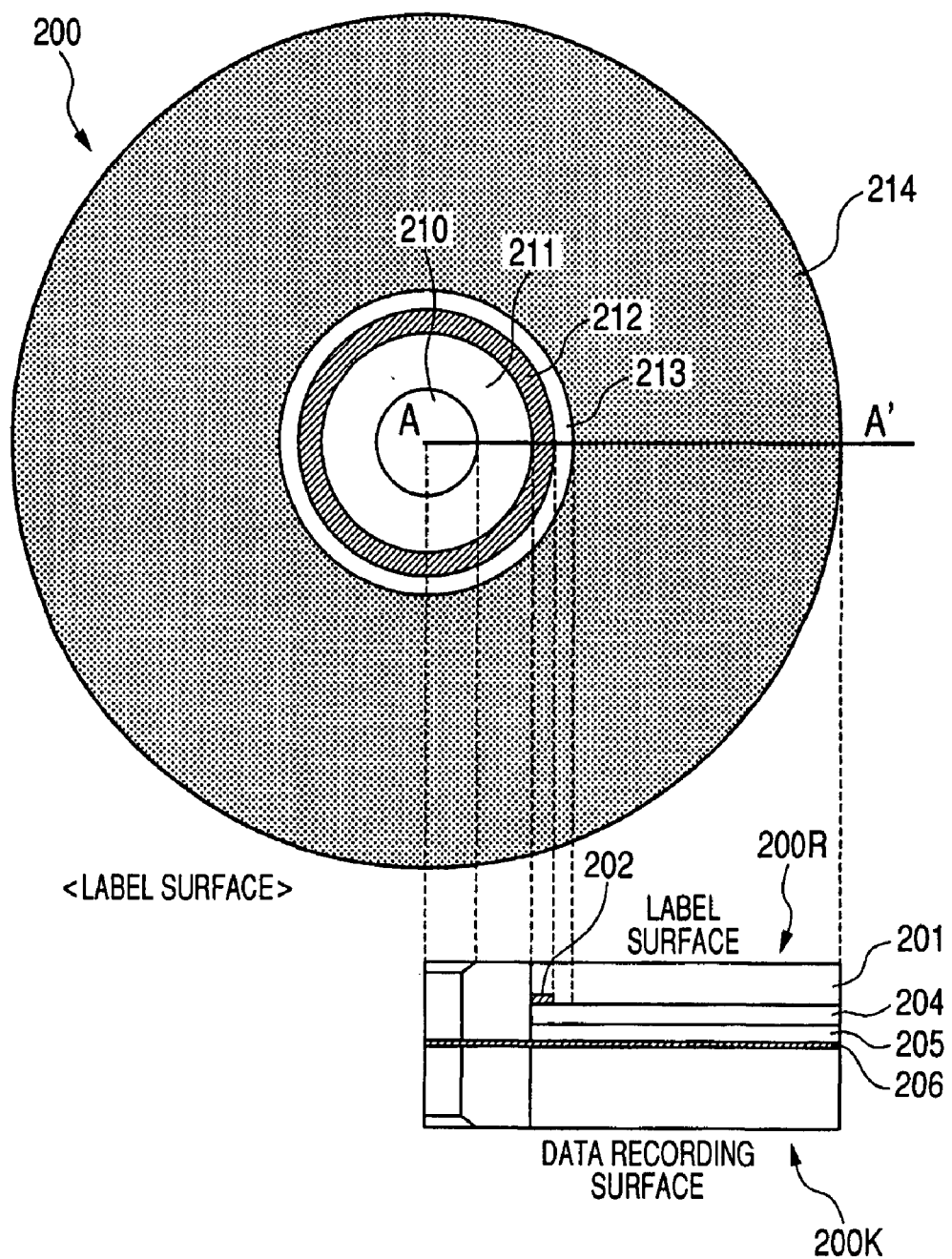
FIG. 2 is a schematic front surface view of a label surface of an optical disk that can form a visible image and a sectional view taken along A-A'.

FIG. 2 is a schematic front surface view of the label surface of the optical disk that can form the visible image and a sectional view taken along A-A'. As shown in FIG. 2, the optical disk 200 is a DVD-R having a structure in which two base materials 200K and 200R are bonded together. The base material 200R of the label surface side has a structure that a protecting layer (a poly-carbonate base plate) 201, an information recording layer 202, the discoloring layer (a coloring matter layer) 204, a reflecting layer 205 and an adhesive layer 206 are laminated in order from the label surface side. Further, in the optical disk 200, a clamp area 211 is provided in the periphery of a center hole 210 provided at a center. Further, in the periphery thereof, an information area 212, a servo adjusting area 213 and an image forming area 214 are formed in order from an inner peripheral side.

Since the structure of layers of the base material 200K in the recording surface side is a well-known for the DVD-R, an illustration is omitted. Further, the structure of the optical disk 200 shown in FIG. 2 is schematic and the dimensional ratio of each layer and each area does not necessarily correspond to that shown in the drawing.

The protecting layer 201 is made of a transparent material such as poly-carbonate to transmit the laser beam.

The information recording layer 202 is a layer whose track composed of a plurality of pits is formed on the poly-carbonate base plate and on which the information of the label surface is recorded. Specifically, code information showing a producing maker, the name of a coloring matter used in the discoloring layer 204 and the information of a start position and an end position of the image forming area 214 are recorded. Further, the optical disk 200 is the DVD-R, however, to prevent another optical disk device from reading the information of the information recording layer 202 and erroneously operating, the track is formed by a plurality of pits on the information recording layer 202 like a CD-ROM, and information is recorded on this track by using a sub-coding format of a CD. Further, the information (the information about the label surface) different from the contents of the information used for sub-coding is recorded. Accordingly, the optical disk device other than the optical disk image forming device 10 cannot read the information recorded in the information area 212.

The discoloring layer 204 is composed of an organic coloring matter different from that of a recording layer that is not shown in the drawing and is provided in the base material 200K so that a clear visible image with a sharp brightness can be formed. The organic coloring matter is discolored by a laser beam of a weaker power than that of the coloring matter used in the recording layer of the data recording surface not shown and the degree of change of a reflection factor thereof is larger.

The reflecting layer 205 is made of metal such as aluminum to reflect the laser beam.

The adhesive layer 206 is a layer for allowing the base material 200R of the label surface side to adhere to the base material 200K of the data recording surface side.

The information area 212 includes the information recording layer 202 in the entire area thereof and includes, as described above, the information of the start position and the end position of the image forming area 214 formed on the label surface of the optical disk 200. It is only in the information area 212 that the track is formed in the base material 200R of the optical disk. The track is not formed in other areas. Though the optical disk 200 is the DVD-R, the pits are formed on the track provided in the information recording layer 202 in the same size and pitch as those used in the CD and data (information) is recorded in a data format used in the CD. Accordingly, the information recorded in the information area 212 cannot be read by an ordinary optical disk.

The servo adjusting area 213 is an area used for adjusting a focus gain by applying to the area the laser beam of the laser power by which the discoloring layer is not changed and measuring a quantity of returning light when the optical disk image forming device 10 forms the visible image in the image forming area 214. The servo adjusting area 213 may not be necessarily provided. For instance, when the image forming area 214 is desired to be even slightly widened, the servo adjusting area 213 may not be provided. In this case, the focus gain may be adjusted in the information area 212.

The image forming area 214 is an area for forming the visible image by the optical disk image forming device 10.

<Discoloring Characteristics of Optical Disk>

The power of the laser beam applied to the discoloring layer to form the visible image on the optical disk or the quantity of the returning light of the laser beam applied to the discoloring layer has respectively different values when the kinds of the coloring matters used in the discoloring layer are different. Further, when the laser beam is applied to the optical disk rotating at the constant angular velocity to form the visible image, even if the laser power is changed depending on the recording position in the radial direction of the optical disk to equalize the strength of the laser beam applied to each unit area, the strength of the laser power may be varied due to dust or a disturbance such as a surface vibration. Thus, the inventors of the present invention of this application paid attention to the relation between the laser power and an asymmetry ($\beta$) or a degree of modulation for the discoloration of the coloring matter of the discoloring layer and carried out the following experiment.

Figure 3A:
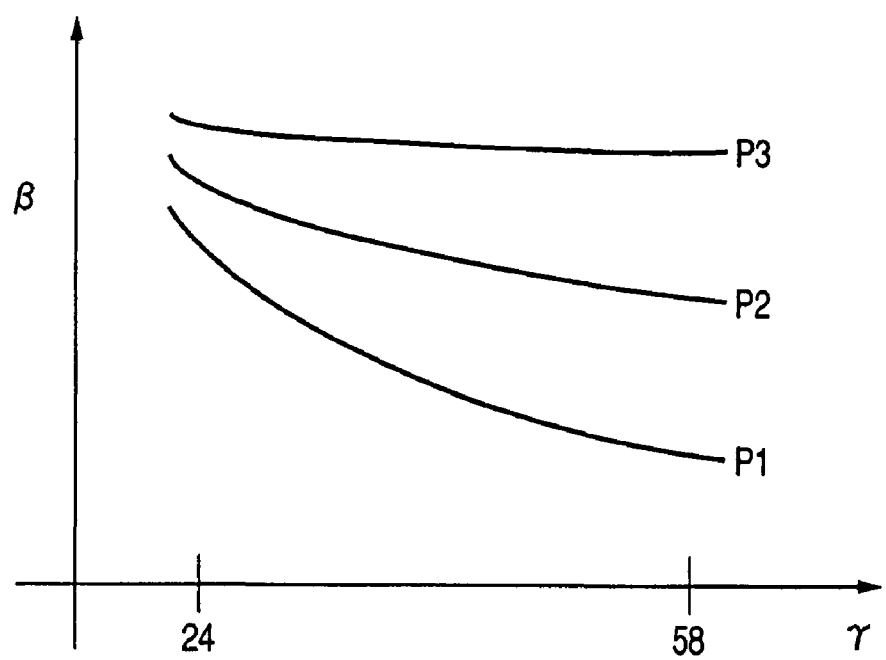
FIG. 3A is a graph showing position in the radial direction of the optical disk-asymmetry ($\beta$) characteristics.
Figure 3B:
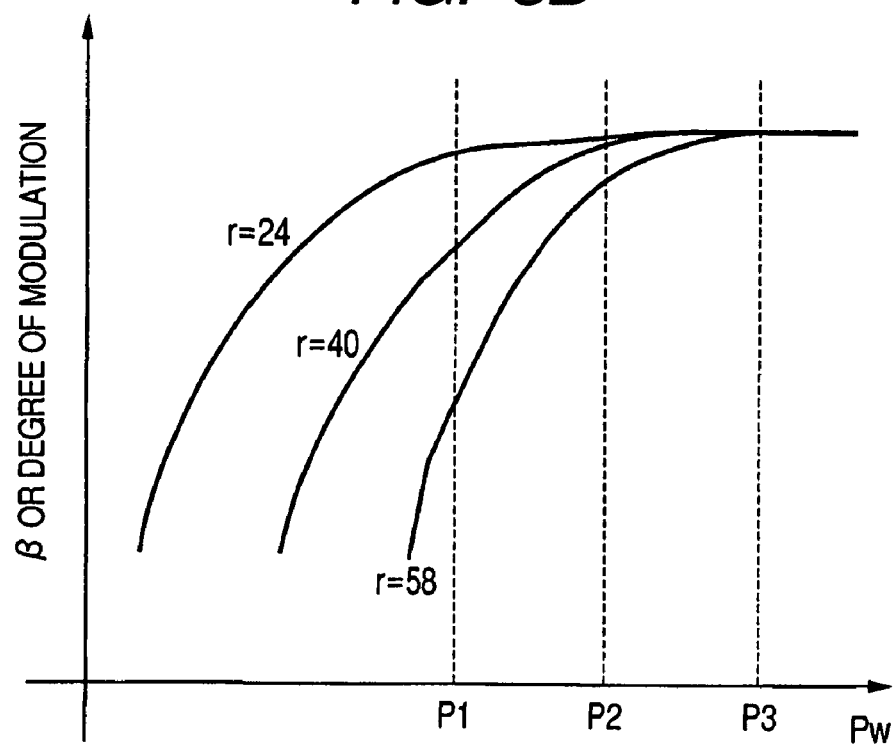
FIG. 3B is a graph showing laser power strength-asymmetry ($\beta$) characteristics.
Figure 3C:
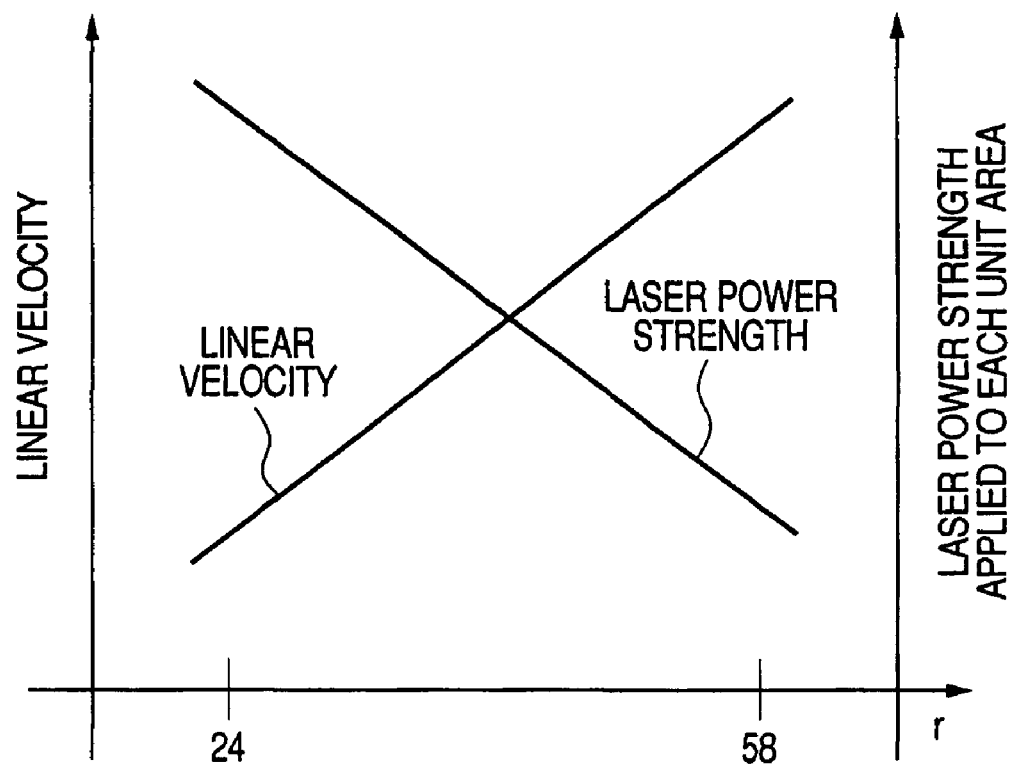
FIG. 3C is a graph showing a linear velocity in the radial direction of the optical disk and the strength of a laser beam applied to each unit area.

FIG. 3A is a graph showing a position in the radial direction of the optical disk-asymmetry ($\beta$) characteristics. FIG. 3B is a graph showing the laser power strength—the asymmetry ($\beta$) characteristics. FIG. 3C is a graph showing the linear velocity in the radial direction of the optical disk and the strength of the laser beam applied to each unit area. FIG. 3 shows P1<P2<P3 and data when the optical disk is at the constant angular velocity. Therefore, when the position in the radial direction of the optical disk is becomes larger, the linear velocity is the more increased. In FIG. 3, the asymmetry ($\beta$) is shown as a parameter, however, the degree of modulation may be used in place of the asymmetry to obtain the same characteristics as those shown in FIG. 3.

As shown in FIG. 3A, when the laser beam having a constant laser power is applied to the optical disk, as the position in the radial direction of the optical disk becomes larger, the value of the asymmetry ($\beta$) is gradually lowered. However, as the strength of the laser power is increased more, the rate of decrease of the value of the asymmetry ($\beta$) is the more gentle. Further, in the case of the laser power P3, the value of the asymmetry ($\beta$) is substantially constant irrespective of the position in the radial direction of the optical disk.

Under a state that the asymmetry ($\beta$) or the degree of modulation is constant, the change of the coloring matter of the discoloring layer to which the laser beam is applied is completed and stabilized, so that the coloring matter of the discoloring layer of the optical disk is completely discolored (a state that the discoloration of the coloring matter is saturated). When the laser beam of the laser power P3 is applied, the coloring matter of the discoloring layer of the optical disk is completely discolored. Thus, even when the laser beam of a stronger laser power is further applied to the discoloring layer, the coloring matter of the discoloring layer is not discolored.

In the graph shown in FIG. 3(B), the parameter of the graph shown in FIG. 3(A) is replaced by another parameter. This graph shows the state of the change of the values of the asymmetry ($\beta$) relative to the laser power applied to the optical disk, when the position r in the radial direction of the optical disk 200 is r=24 mm, 40 mm and 58 mm. As shown in FIG. 3(B), as the laser power P is increased more, the value of the asymmetry ($\beta$) is also increased to be a constant value (saturated) irrespective of the position r in the radial direction of the optical disk 200, that is, the linear velocity. Namely, when the position in the radial direction of the optical disk is r=24 mm, the asymmetry ($\beta$) is saturated by the laser power P2. However, the value of the asymmetry ($\beta$) is saturated by the laser power P3 irrespective of the position in the radial direction of the optical disk, that is, the linear velocity.

As described above, under a state that the asymmetry ($\beta$) or the degree f modulation is saturated, the coloring matter of the discoloring layer is completely discolored, that is, the discoloration is saturated. Thus, in the present invention, when the visible image is formed, the laser beam of the laser power by which the value of the asymmetry ($\beta$) or the degree of modulation is saturated in the position r in the radial direction at which the linear velocity is a maximum velocity, namely, in an outermost peripheral position in the image forming area of the optical disk, irrespective of the position r in the radial direction of the optical disk as described above is set to be applied. Thus, as shown in FIG. 3(C), while the linear velocity is increased more in the outer peripheral side in the radial direction of the optical disk, since the strength of the laser power of the laser beam applied to the image forming area of the optical disk is fixed, the strength of the laser beam applied to each unit area is decreased the more in the outer peripheral side in the radial direction of the optical disk. However, since the laser beam having the strength of the laser power by which the discoloration of the coloring matter of the discoloring layer is saturated irrespective of the linear velocity is applied, even when the strength of the laser power is slightly changed due to the disturbance such as the surface vibration during forming the visible image on the label surface of the optical disk, the visible image in a state that the discoloration of the coloring matter of the discoloring layer is saturated can be formed without receiving the influence thereof. Namely, the visible image having a constant contrast can be formed irrespective of the position in the radial direction of the optical disk.

In the optical disk image forming device 10, the ROM 171 of the control part 170 stores a table in which the data of the strength of the laser power is stored. The laser power strength data represents a value as the asymmetry ($\beta$) or the degree of modulation is saturated in accordance with the kinds of the coloring matters used in the discoloring layer of the optical disk or a recording linear velocity (the number of multiplication of speed) so as to from the visible image with the constant contrast on the image forming area of the optical disk as described above. The data of the laser power strength stored in this table is previously obtained by a meter of the optical disk image forming device 10 in accordance with an experiment.

FIG. 4 shows one example of the table for storing the data of the strength of the laser power of the laser beam applied to the image forming area during forming the visible image. As shown in FIG. 4, in the table stored in the ROM 171, the names of the coloring matters used in the discoloring layer, the number of multiplication of speed (a maximum linear velocity) that can be set during forming the visible image on the optical disk and the setting values of the laser power corresponding thereto are stored.

When the visible image is formed on the optical disk, the control part 170 of the optical disk image forming device 10 reads the information of the kind of the coloring matter used in the discoloring layer of the optical disk 200 that is stored in the information area 212 of the optical disk 200. Further, the control part 170 reads the number of multiplication of speed (the maximum linear speed) during forming the visible image that is set in the host PC 300 from a RAM not shown in the drawing. Then, the control part reads the setting value of the laser power meeting the optical disk 200 from the table stored in the ROM 171 on the basis of the information. Then, the optical disk image forming device 10 changes the value of the laser power in accordance with these values.

<Visible Image Forming Operation of Optical Disk Image Forming Device>

Figure 5:
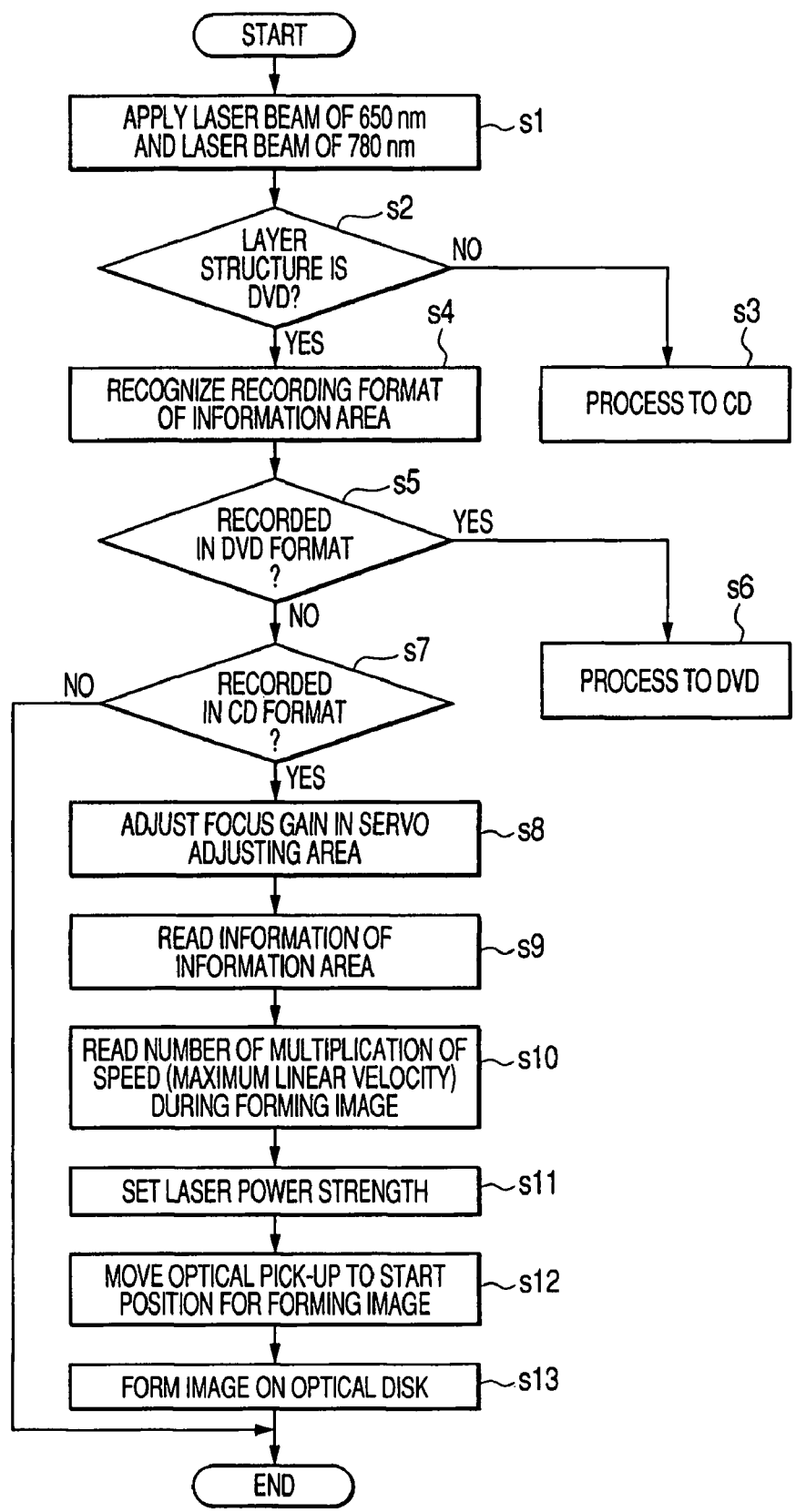
FIG. 5 is a flowchart for explaining a visible image forming operation of the optical disk image forming device.

Now, a visible image forming operation of the optical disk image forming device 10 will be described by referring to a flowchart. FIG. 5 is a flowchart for explaining the visible image forming operation of the optical disk image forming device. Here, the optical disk image forming device 10 forms the visible image on the label surface of the optical disk 200 by a well-known visible image forming method. As one example, a case will be described that the visible image is formed on the optical disk having a discoloring layer provided on the label surface side of the DVD-R.

The control part 170 of the optical disk image forming device 10 outputs a control signal to the servo circuit 138 to allow the spindle motor 130 to rotate the optical disk 200 and outputs a control signal to the ALPC circuit 162 to apply the laser beam of 650 nm and the laser beam of 780 nm to the optical disk 200 from the optical pick-up 100 (s1). Then, the control part recognizes whether or not the layer structure of the optical disk 200 indicates a DVD (s2). When the optical disk 200 does not have the layer structure of the DVD, the control part 170 performs a process to the optical disk of a CD type (s3).

When the optical disk 200 has the layer structure of the DVD, the recording format of the information area 212 is recognized (S4). When the data recorded in the information area 212 is recoded in DVD format (S5), a process to the optical disk of a DVD type is performed (S6). When the information recorded in the information area 212 is not the CD format, the process is finished.

On the other hand, when the data stored in the information area 212 has a CD format (s7), since the optical disk is met by the optical disk image forming device 10 of the present invention, the control part 170 outputs a control signal to the motor driver 142 to move the optical pick-up 100 to a position opposed to the servo adjusting area 213 by the stepping motor 140 to adjust the focus gain (s8). Then, the control part 170 outputs a control signal to the motor driver 142 to move the optical pick-up 100 to a position opposed to the information area 212 by the stepping motor 140 and decodes the information recorded in the information area 212 by the decoder 136 to read the information such as the start position and the end position of the image forming area 214 formed on the label surface of the optical disk 200 and the kind of the coloring matter used in the discoloring layer of the optical disk 200 (s9). Further, the control part 170 reads the number of multiplication of speed (the maximum linear velocity) during forming the visible image that is set in the host PC 300 from the RAM not shown in the drawing (s10). Then, the control part 170 reads, from the table of the ROM 171, the information of the setting value of the laser power corresponding to the kind of the coloring matter used in the discoloring layer of the optical disk 200 and the number of multiplication of speed (the maximum linear velocity) during forming the visible image to set the strength of the laser power to the value (s11). For instance, as shown in FIG. 4, when oxonol is used in the discoloring layer of the optical disk 200 and the visible image is formed at 8 time speed, the control part 170 sets the laser power to 38 mW.

Subsequently, the control part 170 outputs a control signal to the motor driver 142 to move the optical pick-up 100 to a position opposed to a start point of forming the visible image in the image forming area 214 (s12) to rotate the optical disk at a constant speed, apply the laser beam having the strength of the laser power set in the step s11 to the optical disk and carry out a focus servo and form the visible image corresponding to visible image data transmitted from the host computer 300 (s13). When the visible image corresponding to the visible image data sent from the host computer 300 is completely formed, the control part 170 finishes processes.

<Another Structure of Optical Disk and Operation of Optical Disk Image Forming Device>

The optical disk image forming device 10 can form the visible image on optical disks having below-described structures as well as the optical disk 200 having the structure described with reference to FIG. 2. Namely, the optical disk image forming device 10 can form the visible image on an optical disk 221 having a groove (a guide groove) formed in an information area 212 (an information recording layer 202), an optical disk 222 having grooves formed in an information area 212 and a servo adjusting area 213 and an optical disk 223 having a track formed with a plurality of pits in an information area 212 and a groove formed in a servo adjusting area 213. Since the optical disks 221 to 223 have substantially the same structure as that of the optical disk 200 shown in FIG. 2, the illustration of the optical disks 221 to 223 is omitted.

In the information areas 212 (the information recording layers 202) of the optical disks 221 and 222, grooves are formed in place of the track composed of the plurality of pits, as on the data recording surface of a DVD-R/RW or a DVD+R/RW in the case of the (DVD-R/RW) of an LPP (Land Pre-Pit) system or the (DVD+R/RW) of an ADIP (Address in Pre-Groove) system. Then, in these grooves, the same address information as that of the DVD-R/RW or the DVD+R/RW and disk physical information having different contents (information about a label surface) is recorded in the same format. Further, in the servo adjusting areas 213 of the optical disks 222 and 223, address information and information about a label surface are recorded in the same form as that of the information area 212 of the optical disk 221. As described above, since the information about the label surface is recorded with the contents of the information different from those of the data recording surface of the DVD-R/RW or the DVD+R/RW, even when the information recorded on the information area 212 is read, the contents thereof cannot be decoded by other optical disk than the optical disk image forming device 10.

When the optical disk image forming device 10 forms the visible image on the optical disk 221 or the optical disk 222, the optical disk image forming device reads the information recorded in the LPP system or the ADIP system on the information area 212 to form the visible image in an image forming area 214.

Further, when the optical disk image forming device 10 forms the visible image on the optical disk 223, the optical disk image forming device reads the information of the information area 212 as in the case of the optical disk 200 to form the visible image in an image forming area 214.

Further, when the optical disk image forming device 10 forms the visible image on the optical disk 200 or the optical disk 221, the device applies to the servo adjusting area 213 the laser beam of the laser power by which the discoloring layer 204 is not discolored to adjust a focus gain. On the other hand, when the optical disk image forming device 10 forms the visible image on the optical disk 222 or 223, the optical disk image forming device may apply a tracking process to the servo adjusting area 213 and apply the laser beam of the laser power by which a discoloring layer 204 is discolored, that is, a trial write is performed like an OPC to adjust a focus gain. The trial write is carried out in such a way to adjust the focus gain, so that the visible image can be formed in the image forming area of the optical disk with a good visibility having clear light and shade.

Further, on the data recording surface of the optical disk, for instance, when an image forming area is provided from an intermediate part to an outer peripheral side in the radial direction, the names of coloring matters used in the recording layer of the data recording surface side or the information of the start position and the end position of the image forming area is recorded on the optical disk in addition to address information recorded on the optical disk in the LPP system or the ADIP system. When the optical disk image forming device 10 forms the visible image on the data recording surface of the optical disk, the device reads these information to perform processes respectively as in the case of forming the visible image on the label surface side. Thus, the optical disk image forming device can form the visible image on the image forming area of the data recording surface of the optical disk.

When one kind of the coloring matter is used in the discoloring layer 204 of the optical disk 200 meeting the optical disk image forming device 10, a table in which the recording speed is coordinated with the strength of the laser power is stored in the ROM 171. Then, at the time of forming the image, the strength of the laser power may be set on the basis of the information of a maximum linear velocity during forming the visible image without reading the information of the coloring matter used in the discoloring layer 204.

Further, when the kinds of the coloring matters used in the discoloring layer are increased, a firmware may be updated to update the table.

The invention claimed is:

1. An optical disk image forming device for forming a visible image on an optical disk which includes a layer of a coloring matter and in which an image forming area where a track is not formed is set, the optical disk image forming device comprising:
    a rotating unit that rotates the optical disk at a constant angular velocity;
    a laser applying unit that applies a laser beam of a constant laser power strength to the optical disk rotated at the constant angular velocity to form the visible image on the image forming area, to thereby lower the strength of the laser beam applied in a unit area of the optical disk more at the outer periphery of the optical disk; and
    a laser power setting unit that sets the constant laser power strength of the laser beam applied by the laser applying unit to a value by which discoloration of the coloring matter is saturated at an outermost peripheral position of the image forming area when the visible image is formed in the image forming area, the saturation completely discoloring the coloring matter, wherein
    the visible image is formed on a peripheral position different from the outermost peripheral position the image forming area of the optical disk at the constant laser power strength which is set by the laser power setting unit.

2. The optical disk image forming device according to claim 1, wherein the laser applying unit reads information of the coloring matter used in the image forming area from an information area set in the optical disk, and the laser power setting unit sets the constant laser power strength by which the discoloration of the coloring matter is saturated based on the information of the coloring matter.

3. The optical disk image forming device according to claim 1, wherein the laser power setting unit sets, as the constant laser power strength by which the discoloration of the coloring matter is saturated, laser power strength by which an asymmetry or a degree of modulation is saturated when a linear velocity is maximum at the time of forming the image.

4. The optical disk image forming device according to claim 3 further comprising a storing unit that stores the laser power strength by which the asymmetry or the degree of modulation is saturated for each of a plurality of coloring matters used in the image forming area and at each maximum linear velocity that can be set at the time of forming the visible image,
    wherein the laser power setting unit reads from the storing unit the laser power strength by which the asymmetry or the degree of modulation corresponding to the information of the maximum linear velocity set at the time of forming the visible image and the information of the coloring matter is saturated, and setting the read laser power strength as the constant laser power strength by which the discoloration of the coloring matter is saturated.

5. A method of forming a visible image on an optical disk having a layer on which a coloring matter is applied and in which an image forming area where a track is not formed is set, the method comprising:
    a rotating step of rotating the optical disk at a constant angular velocity;
    a laser power strength setting step of setting laser power strength of a laser beam applied to the image forming area to form the visible image on the image forming area to a constant laser power strength by which discoloration of the coloring matter is saturated at an outermost peripheral position of the image forming area, the saturation completely discoloring the coloring matter; and
    an image forming step of forming the visible image on the image forming area by irradiating the optical disk rotated at a constant angular velocity with the laser beam having the constant power strength, to thereby lower the strength of the laser beam applied in a unit area of the optical disk more at the outer periphery of the optical disk, wherein
    the visible image is formed on a peripheral position different from the outermost peripheral position the image forming area of the optical disk at the constant laser power strength which is set by the laser power setting step.

6. The method according to claim 5, wherein the laser power strength setting step includes a step of reading information of the coloring matter used in the image forming area from an information area set in the optical disk, and setting the constant laser power strength by which the discoloration of the coloring matter is saturated based on the information of the coloring matter.

7. The method according to claim 5, wherein in the laser power strength setting step, a laser power strength by which an asymmetry or a degree of modulation is saturated when a linear velocity is maximum at the time of forming the visible image is set as the constant laser power strength by which the discoloration of the coloring matter is saturated.

8. The method according to claim 7 further comprising a storing step of storing in a storing unit the laser power strength by which the asymmetry or the degree of modulation is saturated for each of a plurality of coloring matters used in the image forming area and at each maximum linear velocity that can be set at the time of forming the visible image, wherein in the laser power strength setting step, the laser power strength, by which the asymmetry or the degree of modulation corresponding to the information of the maximum linear velocity set at the time of forming the visible image and the information of the coloring matter is saturated, is read from the storing unit and the read laser power strength is set as the constant laser power strength by which the discoloration of the coloring matter is saturated.

9. An image forming system for forming a visible image by applying a laser beam to an image forming area where a track is not formed set in an optical disk, the image forming system comprising:

an optical disk having a coloring matter layer discolored by applying the laser beam thereto;

a rotating unit that rotates the optical disk at a constant angular velocity;

a laser applying unit that applies the laser beam of a constant laser power strength to the optical disk rotated at the constant angular velocity to form the visible image on the image forming area, to thereby lower the strength of the laser beam applied in a unit area of the optical disk more at the outer periphery of the optical disk; and a laser power setting unit that sets the constant laser power strength of the laser beam applied by the laser applying unit when the visible image is formed in the image forming area to a value by which discoloration of a coloring matter is saturated at an outermost peripheral position of the image forming area, the saturation completely discoloring the coloring matter, wherein the visible image is formed on a peripheral position different from the outermost peripheral position the image forming area of the optical disk at the constant laser power strength which is set by the laser power setting unit.

10. The optical disk image forming system according to claim 9, wherein the laser applying unit reads information of the coloring matter used in the image forming area from an information area set in the optical disk, and the laser power setting unit sets the constant laser power strength by which the discoloration of the coloring matter is saturated based on the information of the coloring matter.

11. The optical disk image forming system according to claim 9, wherein the laser power setting unit sets, as the constant laser power strength by which the discoloration of the coloring matter is saturated, laser power strength by which an asymmetry or a degree of modulation is saturated when a linear velocity is maximum at the time of forming the image.

12. The optical disk image forming system according to claim 11 further comprising a storing unit for storing the laser power strength by which the asymmetry or the degree of modulation is saturated for each of a plurality of coloring matters used in the image forming area and at each maximum linear velocity that can be set at the time of forming the visible image, wherein the laser power setting unit reads from the storing unit the laser power strength by which the asymmetry or the degree of modulation corresponding to the information of the maximum linear velocity set at the time of forming the visible image and the information of the coloring matter is saturated and the read laser power strength is set as the constant laser power strength by which the discoloration of the coloring matter is saturated.

* * * * *